USO10322753B2

(12) United States Patent
Watanabe et al.

(10) Patent No.: US 10,322,753 B2
(45) Date of Patent: Jun. 18, 2019

(54) VEHICLE BODY FRONT STRUCTURE

(71) Applicant: HONDA MOTOR CO., LTD., Minato-ku, Tokyo (JP)

(72) Inventors: Yasunori Watanabe, Sakura (JP); Seiji Suzuki, Utsunomiya (JP); Ryo Fujita, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/735,259

(22) PCT Filed: Jun. 9, 2016

(86) PCT No.: PCT/JP2016/067214
§ 371 (c)(1),
(2) Date: Dec. 11, 2017

(87) PCT Pub. No.: WO2016/208409
PCT Pub. Date: Dec. 29, 2016

(65) Prior Publication Data
US 2018/0170440 A1 Jun. 21, 2018

(30) Foreign Application Priority Data
Jun. 26, 2015 (JP) ................................. 2015-129024

(51) Int. Cl.
*B62D 21/15* (2006.01)
*B62D 25/04* (2006.01)
*B62D 25/08* (2006.01)

(52) U.S. Cl.
CPC ......... *B62D 21/155* (2013.01); *B62D 21/152* (2013.01); *B62D 25/04* (2013.01);
(Continued)

(58) Field of Classification Search
CPC .. B62D 21/155; B62D 25/085; B62D 21/152; B62D 25/088; B62D 25/04; B62D 25/082
(Continued)

(56) References Cited

U.S. PATENT DOCUMENTS 9,248,868 B2 * 2/2016 Stojkovic ............. B62D 27/023
9,296,429 B2 * 3/2016 Mildner ............... B62D 25/082
(Continued)

FOREIGN PATENT DOCUMENTS

CN 1576139 2/2005
CN 1605522 4/2005
(Continued)

OTHER PUBLICATIONS

International Search Report and Written Opinion for International Patent Application No. PCT/JP2016/067214 dated on Aug. 30, 2016, 9 pages.
(Continued)

*Primary Examiner* — Pinel E Romain
(74) *Attorney, Agent, or Firm* — Amin, Turocy & Watson LLP

(57) ABSTRACT

A vehicle body front structure includes a main body section (21) extending forward from a substantially central portion of a front pillar in an upward/downward direction, and an upper member (5) including an extension section (22) extending forward and downward from the main body section (21). The main body section (21) includes a first L-shaped member (31). The extension section (22) includes a second L-shaped member (33). Either one of the first L-shaped member (31) and the second L-shaped member (33) has an extension portion (51) overlapping a wall surface of the other one of the first L-shaped member and the second L-shaped member different from a flange (41) and a flange (42) of the other one of the first L-shaped member (31) and
(Continued)

the second L-shaped member (33). The extension portion (51) is welded to the wall surface by at least one of a plurality of welded section (P1) separated from each other in a vehicle body forward/rearward direction and the welded sections (P1) continuously welded in the vehicle body forward/rearward direction.

6 Claims, 13 Drawing Sheets

(52) U.S. Cl.
CPC ......... *B62D 25/082* (2013.01); *B62D 25/088* (2013.01); *B62D 25/085* (2013.01)

(58) Field of Classification Search
USPC ....................................................... 296/187.5
See application file for complete search history.

(56) References Cited

U.S. PATENT DOCUMENTS

| | | | |
|---|---|---|---|
| 9,969,432 B2* | 5/2018 | Matsushima | B62D 21/152 |
| 2014/0252793 A1 | 9/2014 | Arzoumanian et al. | |
| 2015/0115653 A1* | 4/2015 | Ookubo | B62D 21/152 |
| | | | 296/187.1 |
| 2015/0239503 A1* | 8/2015 | Hara | B62D 21/09 |
| | | | 296/187.09 |
| 2015/0246690 A1* | 9/2015 | Matsumoto | B62D 21/152 |
| | | | 296/187.1 |
| 2015/0344071 A1* | 12/2015 | Nakano | B62D 21/152 |
| | | | 296/187.09 |
| 2017/0088183 A1* | 3/2017 | Yamada | B60R 19/24 |
| 2017/0137064 A1* | 5/2017 | Bokeloh | B62D 21/11 |
| 2017/0151919 A1* | 6/2017 | Kashiwagi | B60R 19/34 |

FOREIGN PATENT DOCUMENTS

| | | |
|---|---|---|
| CN | 102470901 | 5/2012 |
| CN | 102791566 | 11/2012 |
| CN | 104602992 | 5/2015 |
| DE | 102013226093 | 6/2015 |
| JP | 02-048278 | 2/1990 |
| JP | 32-107569 | 8/1990 |
| JP | 08-142912 | 6/1996 |
| JP | 10-203413 | 8/1998 |
| JP | 2004-306803 | 11/2004 |
| JP | 3599327 | 12/2004 |
| JP | 2005-075236 | 3/2005 |
| JP | 2005-153539 | 6/2005 |

OTHER PUBLICATIONS

Chinese Office Action for Chinese Patent Application No. 201680036624.6 dated Feb. 19, 2019.

* cited by examiner

VEHICLE BODY FRONT STRUCTURE

TECHNICAL FIELD

The present invention relates to a vehicle body front structure.

Priority is claimed on Japanese Patent Application No. 2015-129024, filed Jun. 26, 2015, the content of which is incorporated herein by reference.

BACKGROUND ART

A vehicle body front structure includes a front side frame extending forward from below a front section of a passenger compartment, an upper member disposed outside the front side frame in a vehicle body width direction, or the like.

Here, a structure for increasing the rigidity of the vehicle body front section and a structure for more securely absorbing an impact upon collision have been proposed. As the structure for increasing the rigidity of the vehicle body front section, a structure of fixing an upper member to a front pillar through line welding (continuous welding) has been proposed (for example, see Patent Literature 1). In addition, as the structure for more securely absorbing an impact upon collision, a structure in which a skeleton member including a vertical section disposed in front of a front wheel is installed on a tip of an upper member has been proposed (for example, see Patent Document 2).

CITATION LIST

Patent Document

[Patent Document 1]
  Japanese Unexamined Patent Application, First Publication No. 2004-306803
[Patent Document 2]
  Japanese Patent No. 3599327

SUMMARY OF INVENTION

Technical Problem

A certain amount of collision energy can be absorbed by a structure for fixing an upper member to a front pillar through line welding or a structure in which a predetermined skeleton member is installed on a tip of an upper member. However, it is desired to further increase an amount of collision energy absorbed in order to additionally improve safety in the vehicle body front structure.

Here, an aspect of the present invention is to provide a vehicle body front structure in which an amount of collision energy absorbed is able to be increased.

Solution to Problem

A vehicle body front structure according to an aspect of the present invention includes an upper member (for example, an upper member (5) of the embodiment) including a main body section (for example, a main body section (21) of the embodiment) extending forward from a substantially central portion of a front pillar in an upward/downward direction, and an extension section (for example, an extension section (22) of the embodiment) extending forward and downward from the main body section. The main body section includes a first L-shaped member (for example, an upper L-shaped member (31) of the embodiment) having a substantially L-shaped cross section. The extension section includes a second L-shaped member (for example, an upper L-shaped member (33) of the embodiment) having a substantially L-shaped cross section. The main body section and the extension section include a third L-shaped member (for example, a lower L-shaped member (32) of the embodiment) having a substantially L-shaped cross section, the third L-shaped member is formed over the main body section and the extension section, and a closed cross section (for example, a closed cross section (29) of the embodiment) is formed by joining flanges (for example, flanges (41, 42) of the embodiment) formed on both end portions of the first L-shaped member and the second L-shaped member in the vehicle body width direction. Either one of the first L-shaped member and the second L-shaped member has an extension portion (for example, an extension portion (51) of the embodiment), that overlaps a wall surface of the other one of the first L-shaped member and the second L-shaped member different from the flange of the other one of the first L-shaped member and the second L-shaped member. The extension portion is welded to the wall surface by at least one of a plurality of welded sections (for example, a plurality of welded sections (P1) of the embodiment) separated from each other in a vehicle body forward/rearward direction and a welded section (for example, the welded section (P1) of an edge portion (53a) of a hole section (53) of the embodiment) continuously welded in the vehicle body forward/rearward direction.

In this case, the extension portion formed on either one of the first L-shaped member and the second L-shaped member is joined to the wall surface of the other one of the first L-shaped member and the second L-shaped member different from the flange of the other one of the first L-shaped member and the second L-shaped member by welding (for example, MIG welding or laser welding). In addition, at least one of the plurality of welded sections separated from each other in the vehicle body forward/rearward direction and the welded sections continuously welded in the vehicle body forward/rearward direction is formed on the extension portion. When such a welded section is formed, the coupling strength of the joint between the main body section and the extension section can be improved. Accordingly, an amount of collision energy absorbed is increased.

In addition, when the extension portion is the extension portion of one wall section of the L-shaped member, the coupling strength of the joint between the main body section and the extension section can be improved while suppressing a decrease in yield from raw materials.

The extension portion has a hole section (for example, a hole section (53) of the embodiment), and a tip portion (for example, a front edge portion (51a) of the embodiment) of the extension portion and an edge portion (for example, an edge portion (53a) of the embodiment) of the hole section may be welded to the wall surface.

In this case, the extension portion is welded to the wall surface at a plurality of places separated from each other in the vehicle body forward/rearward direction. In addition, as the hole section is formed, a portion (for example, the central portion) other than the end portion of the extension portion can also be welded to the wall surface. For this reason, the coupling strength of the joint between the main body section and the extension section can be further increased. Accordingly, an amount of collision energy absorbed can be further increased.

The extension portion may have an overhanging section (for example, an overhanging section (55) of the embodiment) that overlaps the flange formed on the first L-shaped member or the second L-shaped member having the wall surface, and the overhanging section may be welded to the flange.

Here, the flange is not a wall section having a bag-shaped cross section. For this reason, the overhanging section of the extension portion can be joined to the flange by, for example, spot welding. In other words, according to this configuration, joining between the main body section and the extension section can be performed with a combination of MIG welding or laser welding and spot welding. For this reason, the coupling strength of the joint between the main body section and the extension section is further increased. Accordingly, an amount of collision energy absorbed can be further increased.

The main body section may be installed substantially horizontally, and the extension portion may be formed on the first L-shaped member and may extend forward and downward from the main body section, and a front edge portion (for example, a front edge portion (51a) of the embodiment) of the extension portion may be formed linearly in a substantially vertical direction.

In this case, when the first L-shaped member on which the extension portion is formed is cut out of a rectangular steel sheet (for example, a steel sheet (S1) of the embodiment), it is easy to fit the first L-shaped member including the extension portion to a rectangular steel sheet as a whole without waste. For this reason, even the extension portion is formed, an increase in size required for the steel sheet can be suppressed. Accordingly, the coupling strength of the joint between the main body section and the extension section can be improved while avoiding a decrease in manufacturing yield.

The vehicle body front structure may further include an L-shaped reinforcement member (for example, an L-shaped reinforcement member (61) of the embodiment) formed on the upper member, the upper member may include a lower wall (for example, a lower wall (26) of the embodiment), and an upright wall (for example, an upright wall (28) of the embodiment) standing upward from the end portion of the lower wall in the vehicle body width direction, and the L-shaped reinforcement member may have a substantially L-shaped cross section along the lower wall and the upright wall and may extend from the inside of the main body section toward the inside of the extension section to be joined to the main body section and the extension section.

In this case, even when a force due to a collision is input from the front side of the vehicle body and the joint between the main body section and the extension section bends along the exterior shape of the front wheel, the portion (for example, the lower L-shaped member (32) of the embodiment) to which a compressive load is applied by a force input from the front side of the vehicle body is reinforced by the L-shaped reinforcement member. For this reason, the coupling strength of the joint between the main body section and the extension section with respect to a force input from the front side of the vehicle body is further increased. Accordingly, an amount of collision energy absorbed can be further increased.

The vehicle body front structure may further include a damper base (for example, a damper base (12) of the embodiment) configured to support a damper of a front suspension, and the L-shaped reinforcement member may be joined to the damper base.

In this case, the L-shaped reinforcement member is relatively strongly supported by the damper base. Accordingly, an amount of collision energy absorbed can be further increased.

The first L-shaped member may have a depressed portion (for example, a depressed portion (68) of the embodiment) recessed toward the inside of the vehicle body in the vehicle body width direction and facing at least a portion of the front pillar in the vehicle body forward/rearward direction.

In this case, when a force due to a collision is input from the front side of the vehicle body, as the depressed portion interferes with the front pillar, some of the collision energy can be absorbed between the depressed portion and the front pillar. Accordingly, an amount of collision energy absorbed can be further increased.

The main body section may include a fourth L-shaped member (for example, a lower L-shaped member (34) of the embodiment) installed between the third L-shaped member and the front pillar, having a substantially L-shaped cross section and combined with the first L-shaped member, and the fourth L-shaped member may be joined to an inner panel (for example, an inner panel (72) of the embodiment) of the front pillar and connected to an outer panel (for example, an outer panel (71) of the embodiment) of the front pillar by a connecting member (for example, a connecting member (81) of the embodiment), and the connecting member may be formed at substantially the same height as a partition wall (for example, a partition wall (83) of the embodiment) formed substantially horizontally in the front pillar.

In this case, the fourth L-shaped member is connected to both of the inner panel and the outer panel of the front pillar. For this reason, joining strength between the front pillar and the main body section is further increased. Accordingly, an amount of collision energy absorbed can be further increased.

In addition, when the connecting member and the partition wall are installed at the same height, the rigidity in the vehicle body forward/rearward direction is further increased. Accordingly, an amount of collision energy absorbed can be further increased.

The vehicle body front structure may further include a coupling member (for example, a coupling member (85) of the embodiment) configured to connect the damper base and the front pillar, wherein the main body section may include a fourth L-shaped member (for example, a lower L-shaped member (34) of the embodiment) that is installed between the third L-shaped member and the front pillar, that has a substantially L-shaped cross section and that is combined with the first L-shaped member, and the first L-shaped member and the fourth L-shaped member may form a closed cross section (for example, a closed cross section (29) of the embodiment) together with the coupling member.

In this case, joining strength between the front pillar and the main body section is further increased by the coupling member. Accordingly, an amount of collision energy absorbed can be further increased.

The first L-shaped member may be fastened to the outer panel of the front pillar by a bolt (for example, a bolt (67) of the embodiment).

In this case, joining strength between the front pillar and the main body section is further increased. Accordingly, an amount of collision energy absorbed can be further increased.

Either one of the first L-shaped member and the second L-shaped member having the extension portion may have an overlapping section (for example, an overlapping section (95) of the embodiment) that overlaps a wall surface of the other one of the first L-shaped member and the second L-shaped member different from the flange of the other one of the first L-shaped member and the second L-shaped member, and a fender attachment bracket (for example, a fender attachment bracket (91) of the embodiment) may be sandwiched between the overlapping section and the wall surface which the overlapping section overlaps.

In this case, support strength of the fender attachment bracket can be improved, and assembly workability of the fender attachment bracket can be improved.

Advantageous Effects of Invention

According to the aspect of the present invention, since either one of the first L-shaped member included in the main body section of the upper member and the second L-shaped member included in the extension section of the upper member has the extension portion overlapping the wall surface of the other one of the first L-shaped member and the second L-shaped member different from the flange of the other one of the first L-shaped member and the second L-shaped member, and at least one of the plurality of welded sections separated from each other in the vehicle body forward/rearward direction and the welded sections continuously welded in the vehicle body forward/rearward direction is formed on the extension portion, the coupling strength of the joint between the main body section and the extension section can be improved, and an amount of collision energy absorbed can be increased.

DESCRIPTION OF EMBODIMENTS

Figure 1:
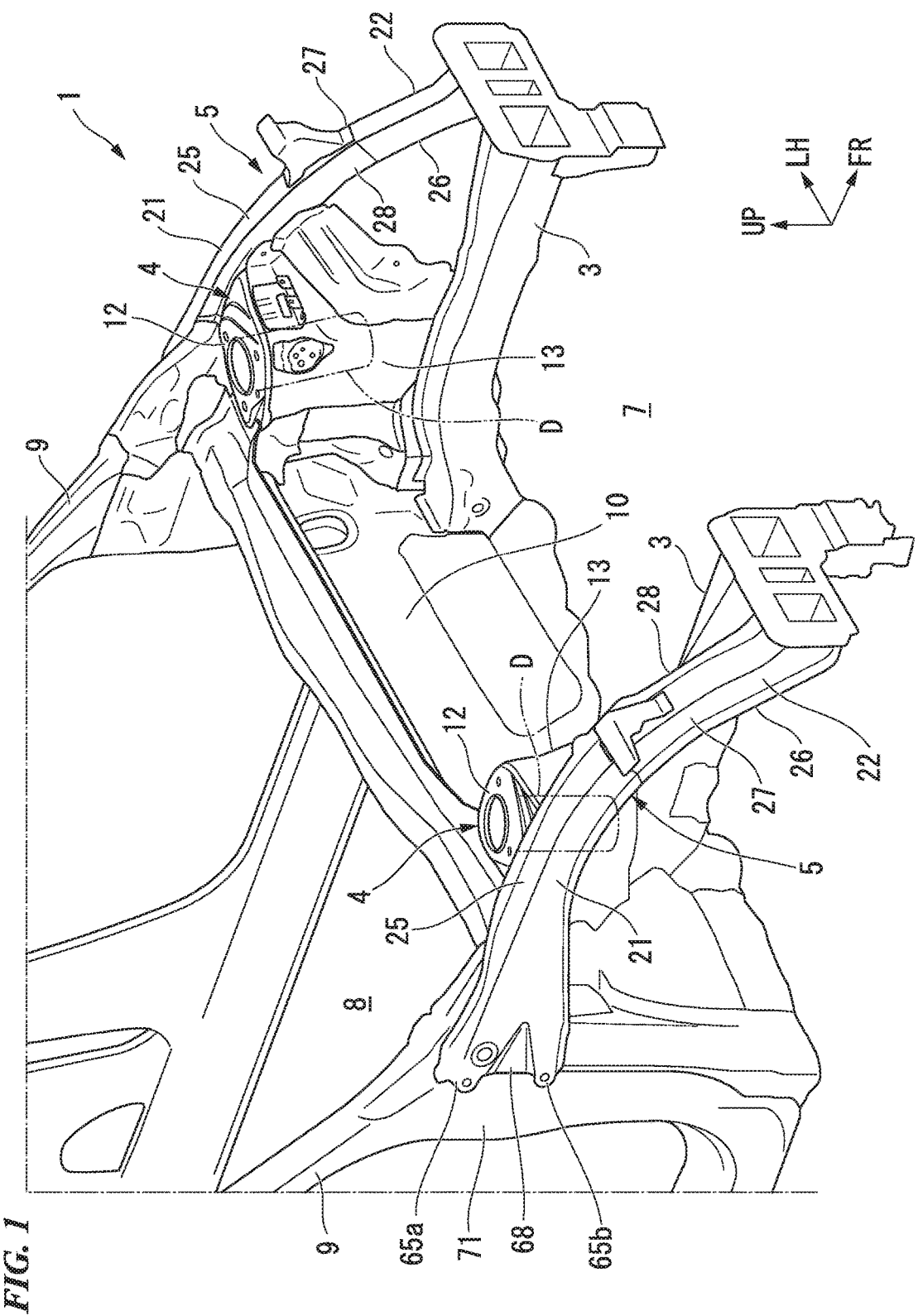
FIG. 1 is a perspective view showing a vehicle body front structure of an embodiment of the present invention from diagonally above.

Hereinafter, an embodiment of the present invention will be described with reference to the accompanying drawings.

In the drawings, an arrow FR designates a forward side in a vehicle body forward/rearward direction. An arrow LH designates a leftward side in a vehicle body width direction. An arrow UP designates an upward side in an upward/downward direction.

In addition, in the application, "an inner side in the vehicle body width direction" designates an inner side of the vehicle body in the vehicle body width direction (i.e., a side of the center of the vehicle body). In addition, "an outer side in the vehicle body width direction" designates an outer side of the vehicle body in the vehicle body width direction (i.e., a side opposite to a center of the vehicle body).

FIG. 1 shows a skeleton section of a front section of a vehicle body 1.

As shown in FIG. 1, the front section of the vehicle body 1 includes a pair of front side frames 3, a pair of damper housings 4, and a pair of upper members 5.

The pair of front side frames 3 are disposed at both sides of an engine compartment 7 in the vehicle body width direction. The front side frames 3 extend forward from below a front section of a passenger compartment 8. Specifically describing, a lower dash panel 10 extending in the vehicle body width direction is installed below the front section of the passenger compartment 8. In addition, a floor frame (not shown) extending in the vehicle body forward/rearward direction is installed below the passenger compartment 8. The front side frames 3 are joined to the lower dash panel 10, the floor frame, and so on.

The pair of damper housings 4 are disposed at both sides of the engine compartment 7 in the vehicle body width direction. Each of the damper housings 4 has a damper base 12 installed on the upper end portion of the damper housing 4, and a wall surface (an inner side surface) 13 directed toward the inner side of the engine compartment 7. The damper base 12 supports a damper D of a front suspension. The wall surface 13 extends between the front side frame 3 and the damper base 12 in the upward/downward direction. A lower end portion of the wall surface 13 is joined to the front side frame 3.

The pair of upper members 5 are disposed at outer sides of the pair of front side frames 3 in the vehicle body width direction. The upper members 5 are joined to front pillars 9 at positions above the front side frames 3, and extend forward from the front pillars 9. The upper members 5 are formed to be curved along contours of front wheels.

Figure 2:
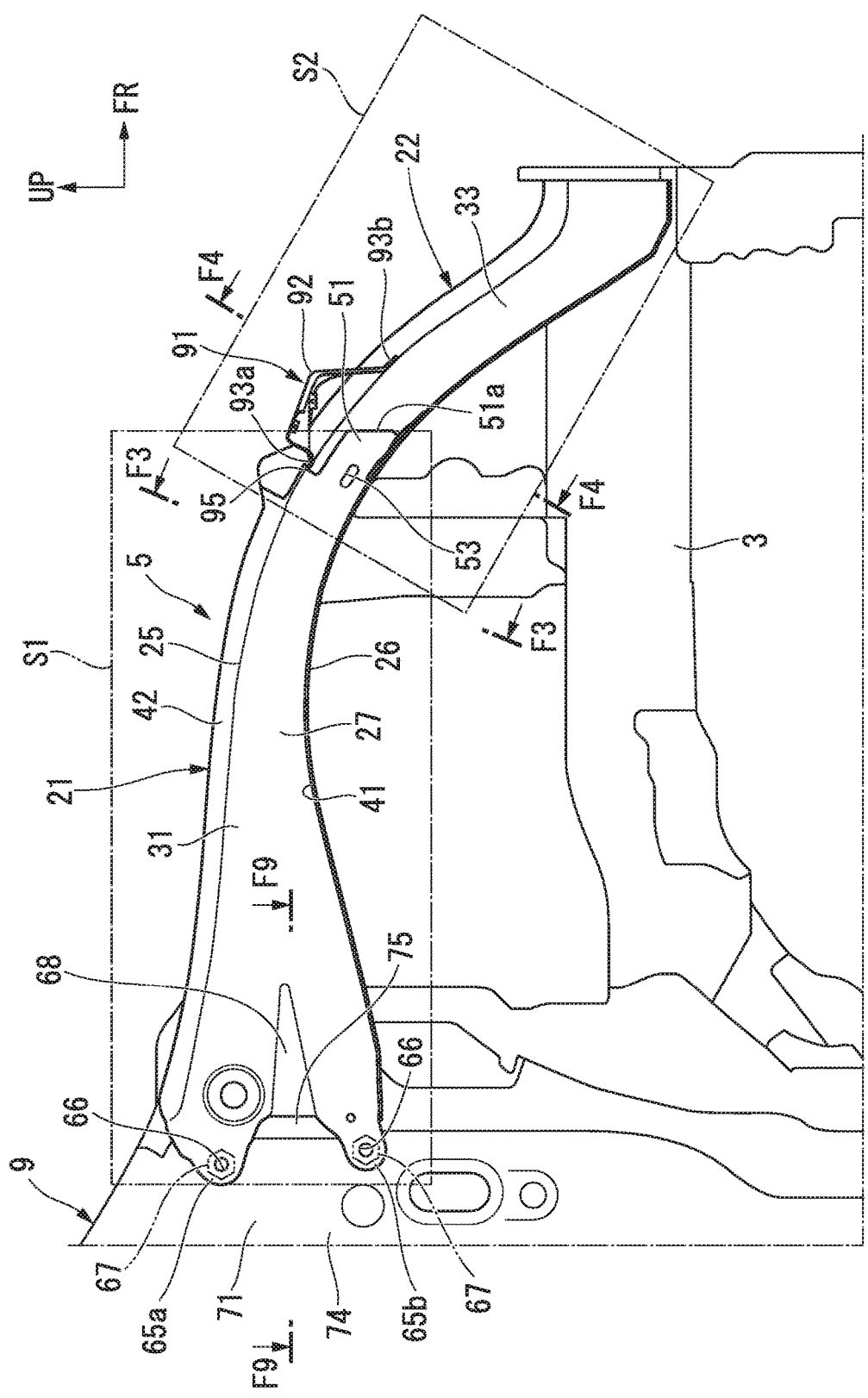
FIG. 2 is a side view showing an upper member of the embodiment of the present invention.

FIG. 2 is a side view showing the upper member 5 of a right side.

As shown in FIG. 2, the upper member 5 has a main body section (a first portion) 21 extending forward from a substantially central portion of the front pillar 9 in the upward/downward direction, and an extension section (a second portion) 22 extending forward and downward from the main body section 21. Further, in the embodiment, a portion including an upper L-shaped member 31 (to be described below) is referred to as the main body section 21, and a portion including another upper L-shaped member 33 is referred to as the extension section 22.

First, the main body section 21 will be described.

As shown in FIG. 2, the main body section 21 is a substantially horizontal linear frame. When the main body section 21 is installed as a linear frame in this way, the upper L-shaped member 31 (to be described below) of the main body section 21 can be cut out of a steel sheet S1 having a rectangular shape.

Figure 3:
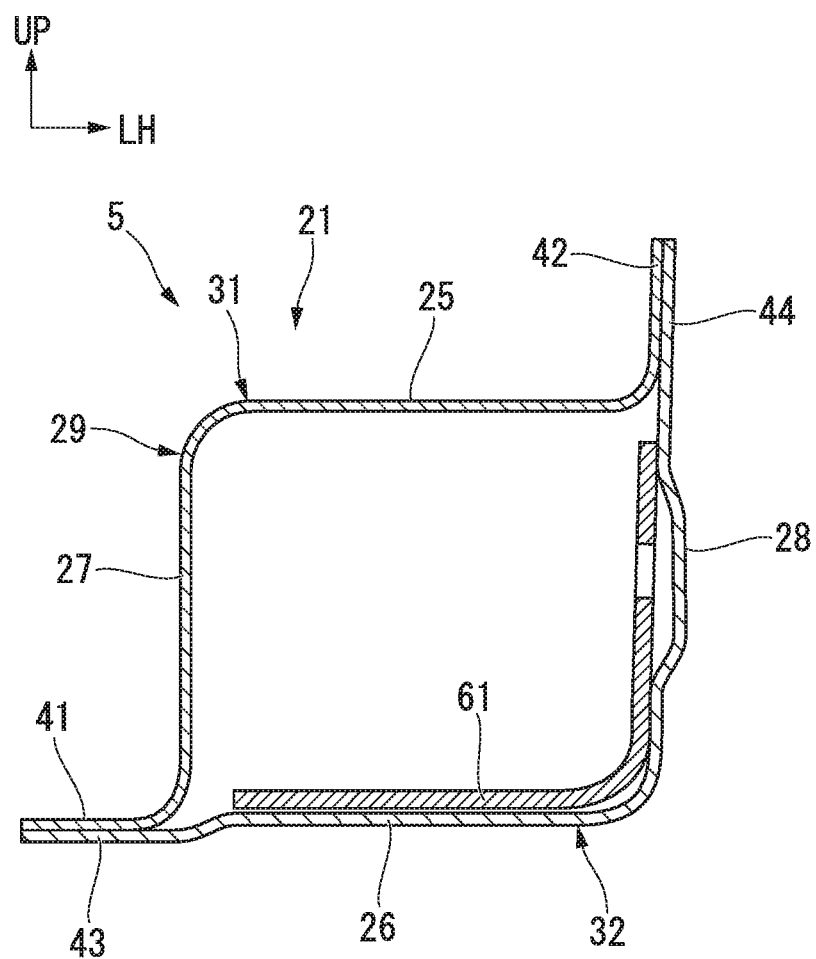
FIG. 3 is a cross-sectional view taken along line F3-F3 of the upper member shown in FIG. 2.

FIG. 3 is a cross-sectional view of the main body section 21 taken along line F3-F3 in FIG. 2.

As shown in FIG. 3, the main body section 21 has an upper wall 25, a lower wall 26, a first standing wall 27, and a second standing wall 28.

The upper wall 25 and the lower wall 26 are separated from each other in the upward/downward direction, and formed in the vehicle body width direction. The first standing wall 27 is an upright wall of the main body section 21 disposed at an outer side in the vehicle body width direction. The first standing wall 27 connects one end portion of the upper wall 25 in the vehicle width direction to one end portion of the lower wall 26 in the vehicle width direction. Meanwhile, the second standing wall 28 is an upright wall disposed at an inner side of the main body section 21 in the vehicle body width direction. The second standing wall 28 connects the other end portion of the upper wall 25 in the vehicle width direction to the other end portion of the lower wall 26 in the vehicle width direction. Accordingly, the main body section 21 has a closed cross section 29 having a rectangular shape.

Here, from another viewpoint, the main body section 21 is formed by combining a pair of upper and lower L-shaped members. Further, in the application, "the L-shaped member" is a member having a substantially L-shaped cross section in a direction perpendicular to a longitudinal direction of the member.

Specifically, the main body section 21 has the upper L-shaped member 31 and a lower L-shaped member 32 as the pair of upper and lower L-shaped members on at least a joint between the main body section 21 and the extension section 22.

The upper L-shaped member 31 includes the upper wall 25 and the first standing wall 27. The upper L-shaped member 31 is an example of "a first L-shaped member." Meanwhile, the lower L-shaped member 32 includes the lower wall 26 and the second standing wall 28, and is combined with the upper L-shaped member 31. The lower L-shaped member 32 is an example of "a third L-shaped member."

The upper L-shaped member 31 has flanges 41 and 42 formed on both end portions of the upper L-shaped member 31 in the vehicle body width direction. The lower L-shaped member 32 has flanges 43 and 44 formed on both end portions of the lower L-shaped member 32 in the vehicle body width direction.

Specifically, the upper L-shaped member 31 has a first flange 41 and a second flange 42.

The first flange 41 is a horizontal flange extending outward from a lower end portion of the first standing wall 27 in the vehicle body width direction. That is, the first flange 41 is a flange extending in the vehicle width direction.

The second flange 42 is formed on the end portion opposite to the end portion of the upper wall 25 to which the first standing wall 27 is connected. The second flange 42 is a vertical flange extending upward from the end portion of the upper wall 25. That is, the second flange 42 is a flange extending in the upward/downward direction.

Similarly, the lower L-shaped member 32 has a third flange 43 and a fourth flange 44.

The third flange 43 is formed on an end portion of the lower wall 26 which is opposite to the end portion of the lower wall 26 to which the second standing wall 28 is connected. The third flange 43 is a horizontal flange extending outward from the end portion of the lower wall 26 in the vehicle body width direction. That is, the third flange 43 is a flange extending in the vehicle width direction. The third flange 43 overlaps the first flange 41 of the upper L-shaped member 31 in the upward/downward direction. The third flange 43 is joined to the first flange 41 of the upper L-shaped member 31 by, for example, spot welding.

The fourth flange 44 is formed on an upper end portion of the second standing wall 28. The fourth flange 44 is a vertical flange extending further upward from the upper end portion of the second standing wall 28. That is, the fourth flange 44 is a flange extending in the upward/downward direction. The fourth flange 44 overlaps the second flange 42 of the upper L-shaped member 31 in the vehicle body width direction. The fourth flange 44 is joined to the second flange 42 of the upper L-shaped member 31 by, for example, spot welding.

Next, the extension section 22 will be described.

As shown in FIG. 2, the extension section 22 is a linear frame extending from the front end portion of the main body section 21 to be inclined or curved forward and downward. When the extension section 22 is formed as a linear frame in this way, the upper L-shaped member 33 (to be described below) of the extension section 22 can be cut out of a steel sheet S2 having a rectangular shape.

Figure 4:
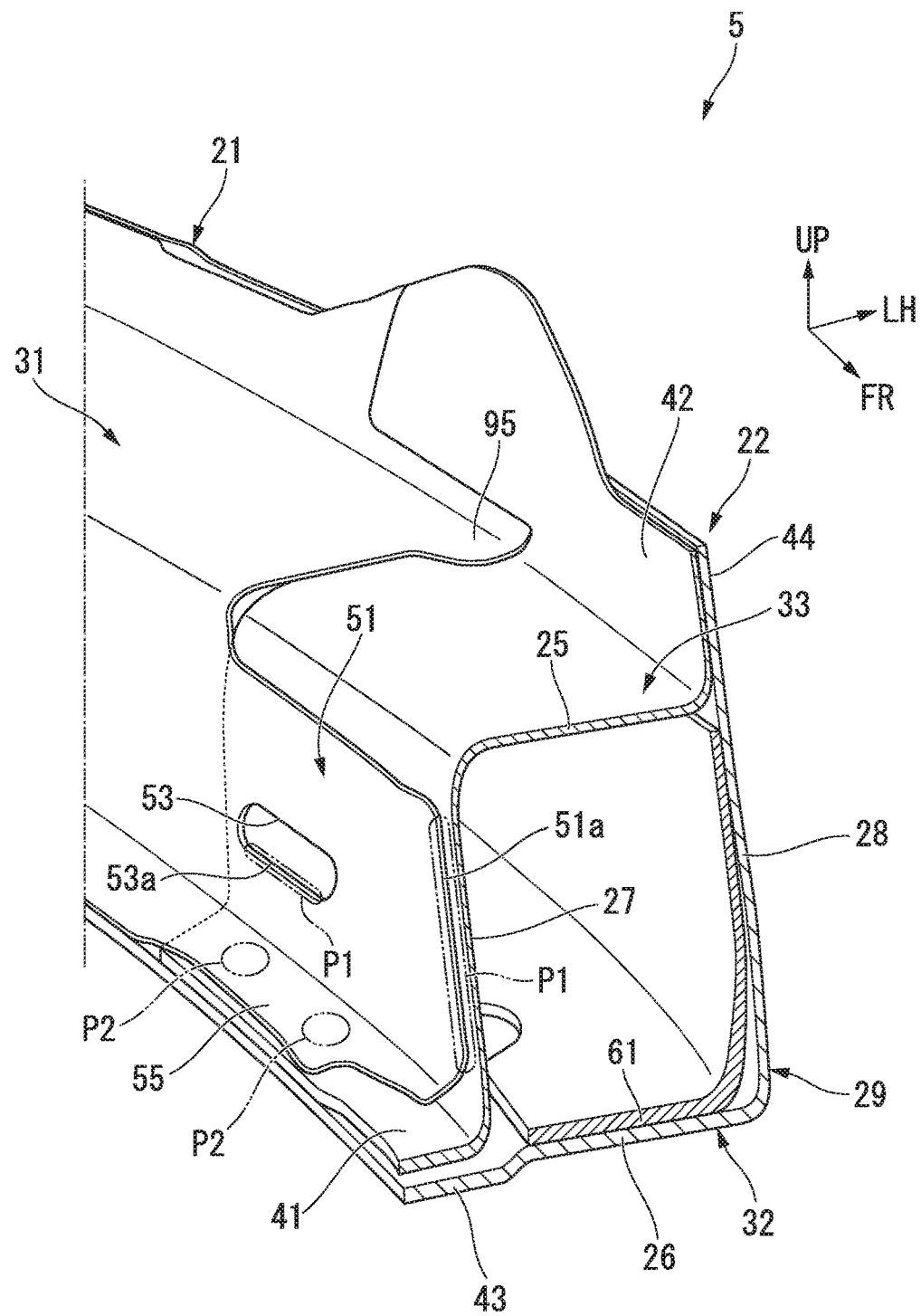
FIG. 4 is a view showing a cross section taken along line F4-F4 of the upper member shown in FIG. 2.

FIG. 4 is a view showing a cross section of the extension section 22 taken along line F4-F4 in FIG. 2.

A cross-sectional shape of the extension section 22 is substantially the same as the cross-sectional shape of the main body section 21. For this reason, components in the cross-sectional shape of the extension section 22 having the same or a similar function as in the cross-sectional shape of the main body section 21 are designated by the same reference numerals, and repeated description of these components will be omitted.

As shown in FIG. 4, like the main body section 21, the extension section 22 has the upper wall 25, the lower wall 26, the first standing wall 27, and the second standing wall 28. In addition, the extension section 22 is formed by combining the pair of upper and lower L-shaped members.

Figure 5:
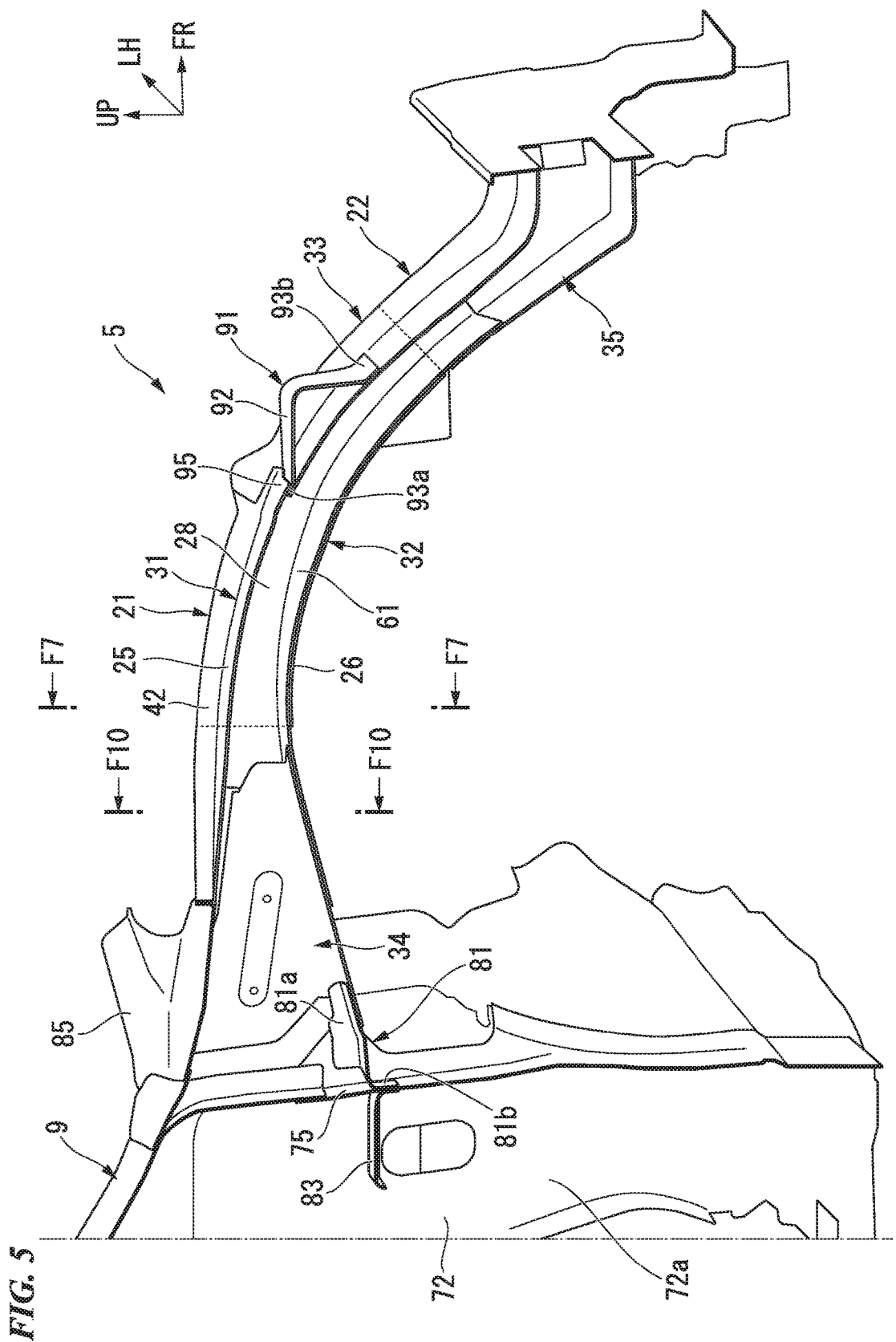
FIG. 5 is a view showing the inside and the cross section of the upper member of the embodiment of the present invention.

FIG. 5 is a view showing the inside and the cross section of the upper member 5 at a substantially central portion of the upper members 5 in the vehicle body width direction.

As shown in FIG. 5, the lower L-shaped member 32 of the main body section 21 extends over both of the main body section 21 and the extension section 22 beyond the joint between the main body section 21 and the extension section 22. In other words, the lower L-shaped member 32 forms a portion of the main body section 21 and forms a portion of the extension section 22. For this reason, the extension section 22 has the upper L-shaped member 33 and the lower L-shaped member 32 serving as the pair of upper and lower L-shaped members on at least the joint between the main body section 21 and the extension section 22. Like the upper L-shaped member 31 of the main body section 21, the upper L-shaped member 33 includes the upper wall 25 and the first standing wall 27. The upper L-shaped member 33 is an example of "a second L-shaped member." Meanwhile, the lower L-shaped member 32 includes the lower wall 26 and the second standing wall 28, and is combined with the upper L-shaped member 33.

As shown in FIG. 4, like the upper L-shaped member 31 of the main body section 21, the upper L-shaped member 33 of the extension section 22 has the first flange 41 and the second flange 42. In addition, the lower L-shaped member 32 of the extension section 22 has the third flange 43 and the fourth flange 44. The third flange 43 of the lower L-shaped member 32 and the first flange 41 of the upper L-shaped member 33 are joined to each other by, for example, spot welding. Similarly, the fourth flange 44 of the lower L-shaped member 32 and the second flange 42 of the upper L-shaped member 33 are joined to each other by, for example, spot welding.

As shown in FIG. 5, the main body section 21 has another lower L-shaped member 34 formed on a portion in which the lower L-shaped member 32 is not formed (i.e., a rear end portion of the main body section 21). In other words, the lower L-shaped member 34 is installed between the lower L-shaped member 32 and the front pillar 9. The lower L-shaped member 34 forms the pair of upper and lower L-shaped members together with the upper L-shaped member 31. Like the lower L-shaped member 32, the lower L-shaped member 34 includes the lower wall 26, the second standing wall 28, the third flange 43, and the fourth flange 44. The lower L-shaped member 34 is an example of "a fourth L-shaped member."

Similarly, the extension section 22 has another lower L-shaped member 35 formed on a portion in which the lower L-shaped member 32 is not formed (i.e., a front end portion of the extension section 22). In other words, the lower L-shaped member 35 is formed between the lower L-shaped member 32 and the tip portion of the upper members 5. The lower L-shaped member 35 forms the pair of upper and lower L-shaped members together with the upper L-shaped member 33. Like the lower L-shaped member 32, the lower L-shaped member 35 includes the lower wall 26, the second standing wall 28, the third flange 43, and the fourth flange 44.

Next, the joint between the main body section 21 and the extension section 22 will be described in detail.

Hereinafter, for the convenience of description, the upper L-shaped member 31 of the main body section 21 is referred to as "the first L-shaped member 31" and the upper L-shaped member 33 of the extension section 22 is referred to as "the second L-shaped member 33."

Figure 6:
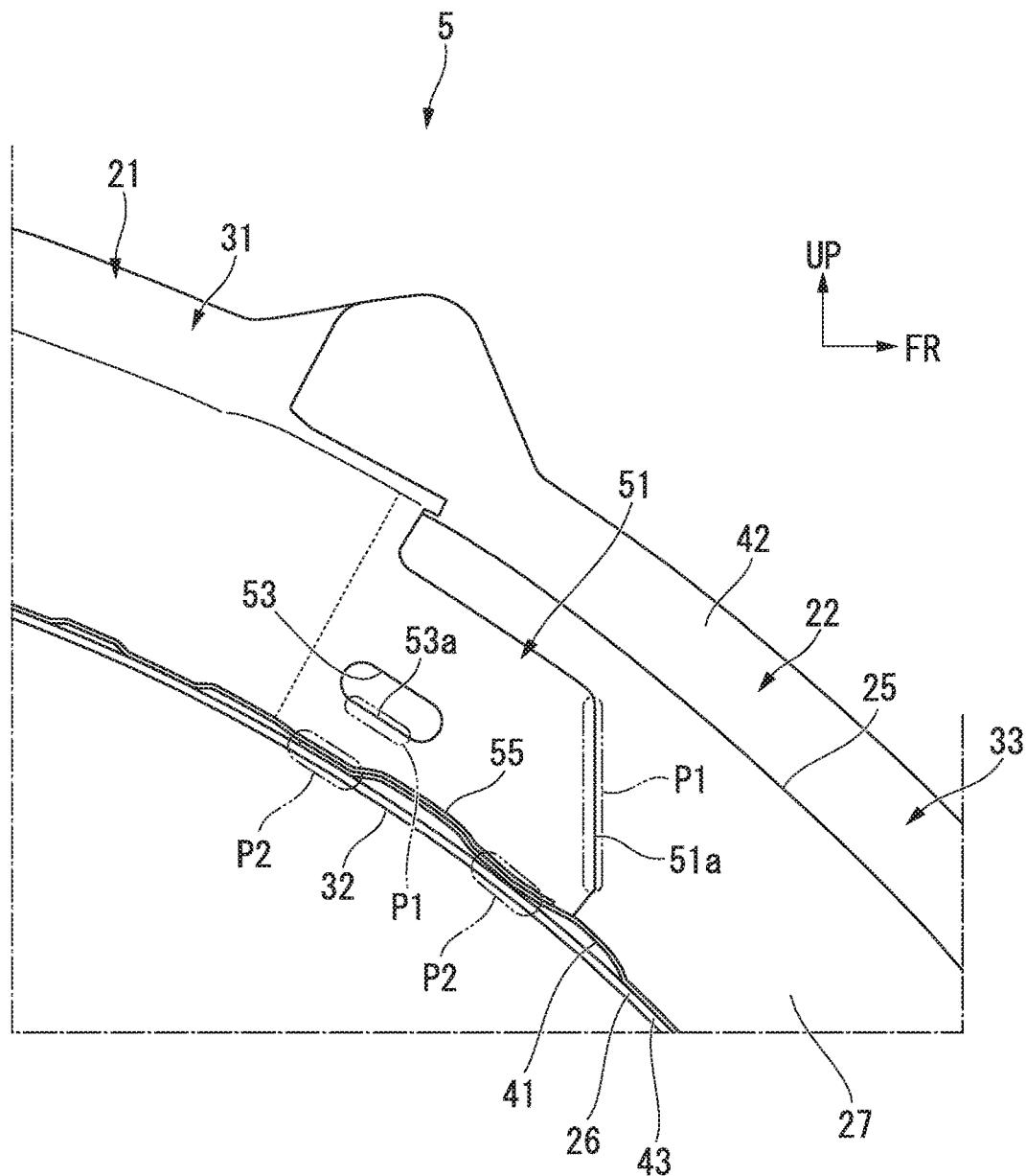
FIG. 6 is a side view showing a joint between a main body section and an extension section of the embodiment of the present invention.

FIG. 6 is an enlarged side view showing the joint between the main body section 21 and the extension section 22.

As shown in FIG. 6, in the embodiment, the first L-shaped member 31 of the main body section 21 has an extension portion 51 extending toward the second L-shaped member 33 of the extension section 22 and overlapping the surface of the second L-shaped member 33. The extension portion 51 overlaps a wall surface of the second L-shaped member 33 different from the first and second flanges 41 and 42. In the embodiment, the extension portion 51 overlaps the first standing wall 27 outside the second L-shaped member 33 in the vehicle width direction.

Specifically describing, as shown in FIG. 4, the extension portion 51 is formed by extending one wall section of the first L-shaped member 31. In the embodiment, the extension portion 51 is formed by extending the first standing wall 27 of the first L-shaped member 31 from the main body section 21 toward the extension section 22.

The extension portion 51 is joined to a wall surface of the first standing wall 27 of the second L-shaped member 33 at a boundary of both by continuous welding (for example, MIG welding or laser welding).

Specifically describing, as shown in FIG. 6, a hole section 53 is formed in the extension portion 51. The hole section 53 passes through the extension portion 51 in a thickness direction of the extension portion 51.

In the extension portion 51, a front edge portion 51a of the extension portion 51 and an edge portion 53a of the hole section 53 are joined to the wall surface of the second L-shaped member 33 by continuous welding (for example, MIG welding or laser welding).

That is, a plurality of welded sections P1 separated from each other in the vehicle body forward/rearward direction are formed on the extension portion 51. In FIG. 6, reference character P1 shows portions joined by MIG welding or laser welding.

More specifically describing, the hole section 53 formed in the extension portion 51 is a hole elongated in a direction from the main body section 21 toward the extension section 22. The hole section 53 has the edge portion 53a in the direction from the main body section 21 toward the extension section 22. The hole section 53 is continuously welded along the edge portion 53a throughout a predetermined length. That is, the extension portion 51 has the welded sections P1 continuously welded in the direction from the main body section 21 toward the extension section 22.

Meanwhile, the front edge portion 51a of the extension portion 51 extends in a direction crossing the direction from the main body section 21 toward the extension section 22. For example, the front edge portion 51a of the extension portion 51 is formed linearly in the upward/downward direction. As shown in FIG. 6, the front edge portion 51a of the extension portion 51 is continuously welded along the front edge portion 51a throughout a predetermined length. That is, the extension portion 51 has the welded sections P1 continuously welded in a direction crossing the direction from the main body section 21 toward the extension section 22.

In other words, the extension portion 51 has the welded sections P1 (for example, the edge portion 53a of the hole section 53) continuously welded in the vehicle body forward/rearward direction and the welded sections P1 (for example, the front edge portion 51a) continuously welded in a direction crossing the vehicle body forward/rearward direction.

Next, a shape of the front edge portion 51a of the extension portion 51 will be described in detail.

As shown in FIG. 2, the main body section 21 is formed substantially horizontally as a whole. Meanwhile, the extension portion 51 of the main body section 21 extends forward and downward from the main body section 21. The front edge portion 51a of the extension portion 51 is formed in a linear shape in a substantially vertical direction. In other words, the front edge portion 51a of the extension portion 51 is formed along one side of the rectangular steel sheet S1 from which the main body section 21 is cut.

Next, an overhanging section 55 formed on the extension portion 51 will be described.

As shown in FIG. 4, the extension portion 51 has the overhanging section 55 overlapping the first flange 41 of the second L-shaped member 33. Specifically describing, the overhanging section 55 is formed as the extension portion 51 is folded outward at the lower end portion in the vehicle body width direction. The overhanging section 55 is formed substantially parallel to the first flange 41 of the second L-shaped member 33. The overhanging section 55 overlaps the first flange 41 of the second L-shaped member 33 in the upward/downward direction. The overhanging section 55 is joined to the first flange 41 of the second L-shaped member 33 together with the third flange 43 of the lower L-shaped member 32 by spot welding. That is, the extension portion 51 is joined to the second L-shaped member 33 by a combination of MIG welding or laser welding and spot welding. Further, in FIGS. 4 and 6, reference character P2 shows portions joined by spot welding.

As shown in FIG. 5, an L-shaped reinforcement member 61 configured to reinforce the upper member 5 is installed in the upper member 5. The L-shaped reinforcement member 61 has a substantially L-shaped cross section (see FIG. 4) along the lower wall 26 and the second standing wall 28 of the upper member 5. In other words, the L-shaped reinforcement member 61 has an L-shaped cross section that is extending along cross-sectional shapes of the lower L-shaped member 32, the lower L-shaped member 34, and the lower L-shaped member 35.

As shown in FIG. 5, the L-shaped reinforcement member 61 extends from the inside of the main body section 21 to the inside of the extension section 22 to straddle the joint between the main body section 21 and the extension section 22. Furthermore, the L-shaped reinforcement member 61 extends over the lower L-shaped member 34 formed on the rear end portion of the main body section 21 and the lower L-shaped member 35 formed on the front end portion of the extension section 22. The L-shaped reinforcement member 61 is joined to the lower L-shaped member 32 and the lower L-shaped member 34 in the main body section 21 and joined to the lower L-shaped member 32 and the lower L-shaped member 35 in the extension section 22. Accordingly, the coupling strength of the joint between the main body section 21 and the extension section 22 is increased.

Figure 7:
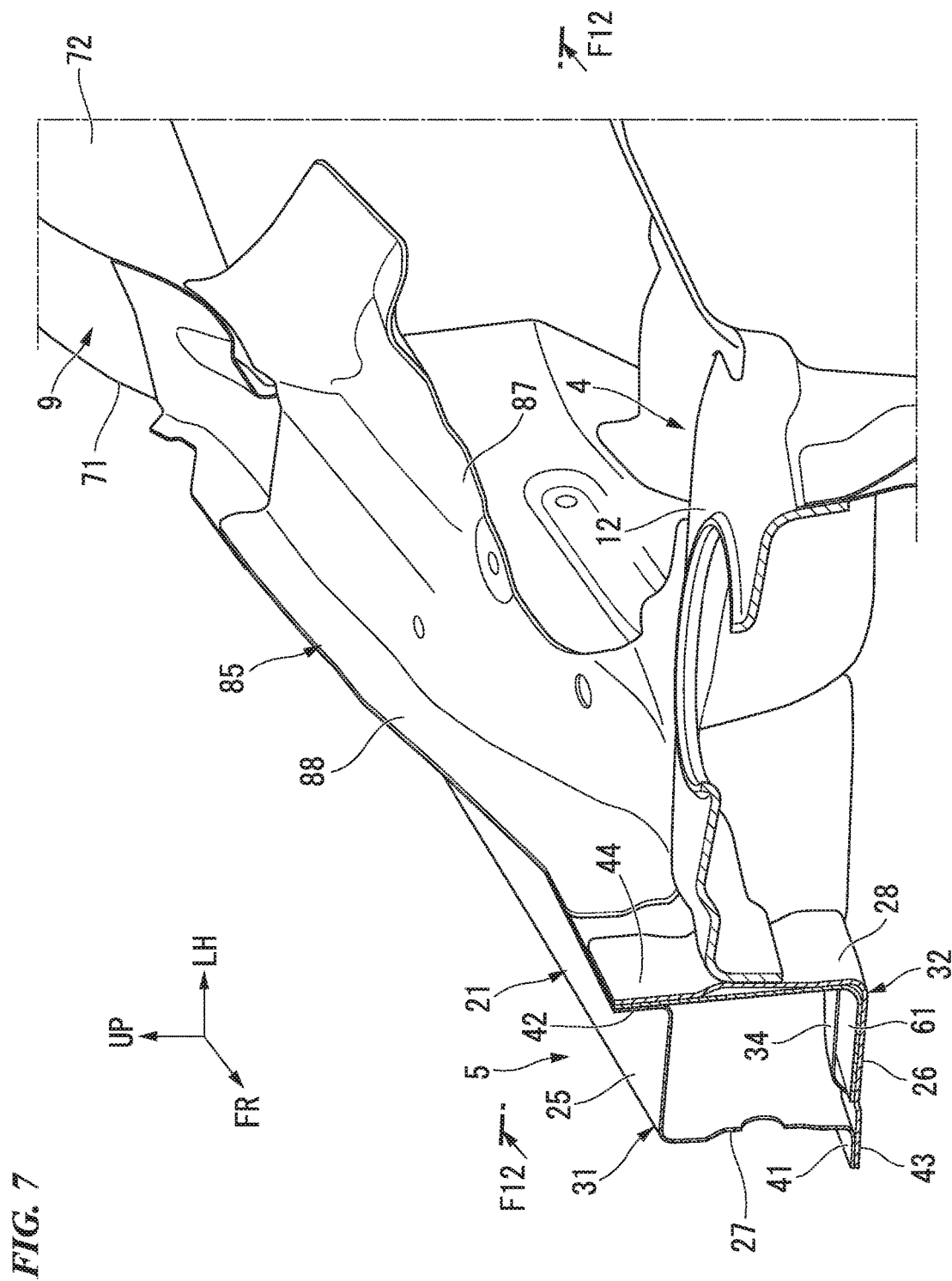
FIG. 7 is a view showing a cross section taken along line F7-F7 of the vehicle body front structure shown in FIG. 5.

FIG. 7 is a view showing a cross section taken along line F7-F7 of the front section of the vehicle body 1 shown in FIG. 5.

As shown in FIG. 7, a base end portion (a base section) of the L-shaped reinforcement member 61 is aligned to the damper base 12 in the vehicle body width direction. The base end portion of the L-shaped reinforcement member 61 is joined to the damper base 12 together with the second standing wall 28 of the lower L-shaped member 32 by welding (for example, spot welding). Accordingly, the base section of the L-shaped reinforcement member 61 is strongly supported by the damper base 12.

Next, an attachment structure of the main body section 21 with respect to the front pillar 9 will be described.

First, an attachment structure of the first L-shaped member (the upper L-shaped member) 31 of the main body section 21 with respect to the front pillar 9 will be described.

As shown in FIG. 2, the rear end portion of the first L-shaped member 31 has two fixing sections 65a and 65b that are vertically separated from each other. The fixing sections 65a and 65b overlap an outer panel 71 of the front pillar 9 outside in the vehicle body width direction. Through-holes 66 through which a bolt 67 can be inserted are formed in the fixing sections 65a and 65b. The fixing sections 65a and 65b are fastened to the outer panel 71 of the front pillar 9 by the bolt 67 passing through the through-holes 66.

As shown in FIG. 2, the rear end portion of the first L-shaped member 31 has a depressed portion 68 between the two fixing sections 65a and 65b. The depressed portion 68 has a half tetrahedron shape (a triangular shape when seen in a side view) in which a width in the upward/downward direction increases as it goes toward a rear side of the vehicle body.

Figure 8:
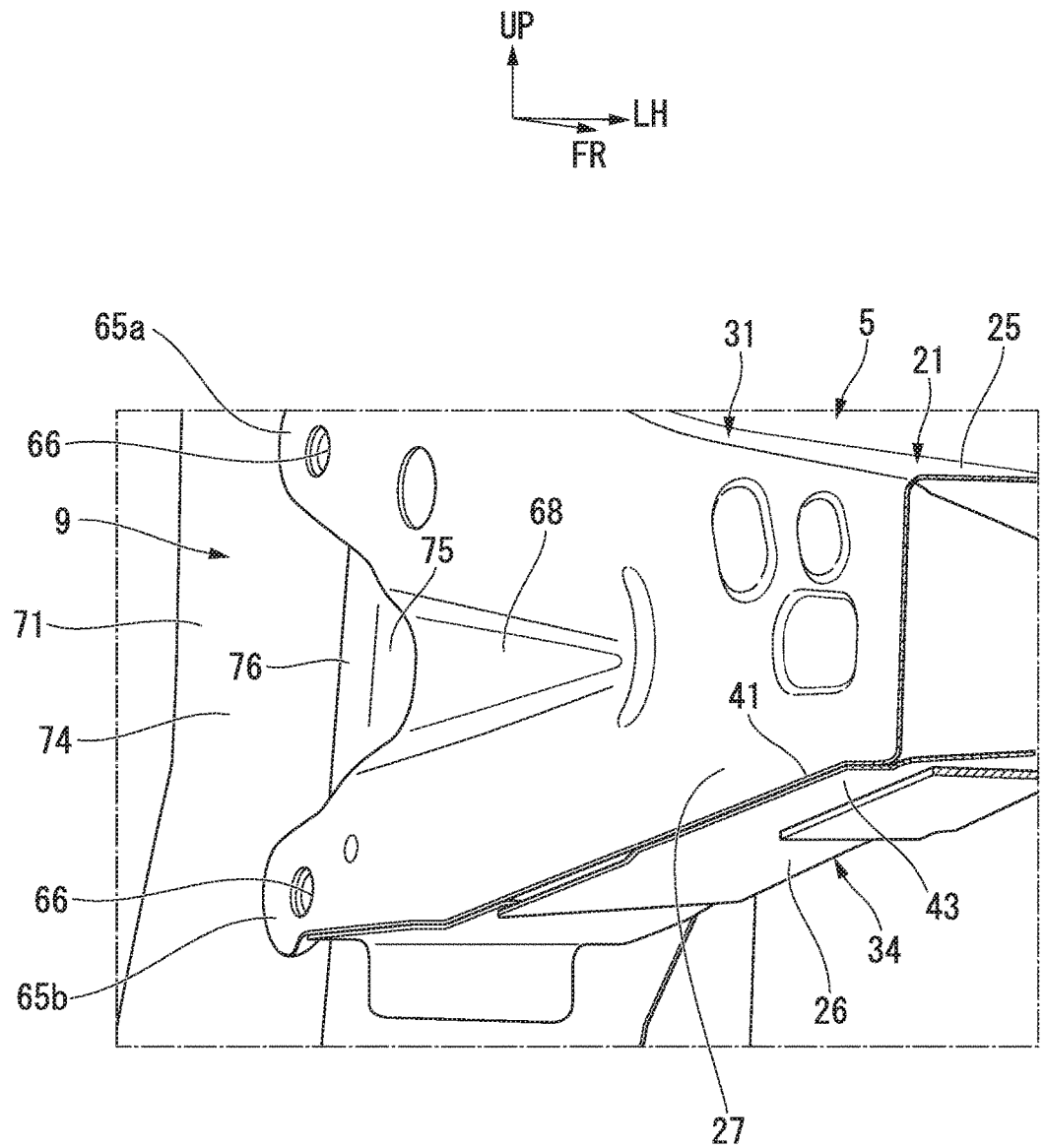
FIG. 8 is a perspective view showing a rear end portion of a first L-shaped member of the embodiment of the present invention from a diagonally front side.

FIG. 8 is a perspective view of the rear end portion of the first L-shaped member 31 from a diagonal forward side.

As shown in FIG. 8, the depressed portion 68 is recessed inward in the vehicle body width direction between the two fixing sections 65a and 65b.

Figure 9:
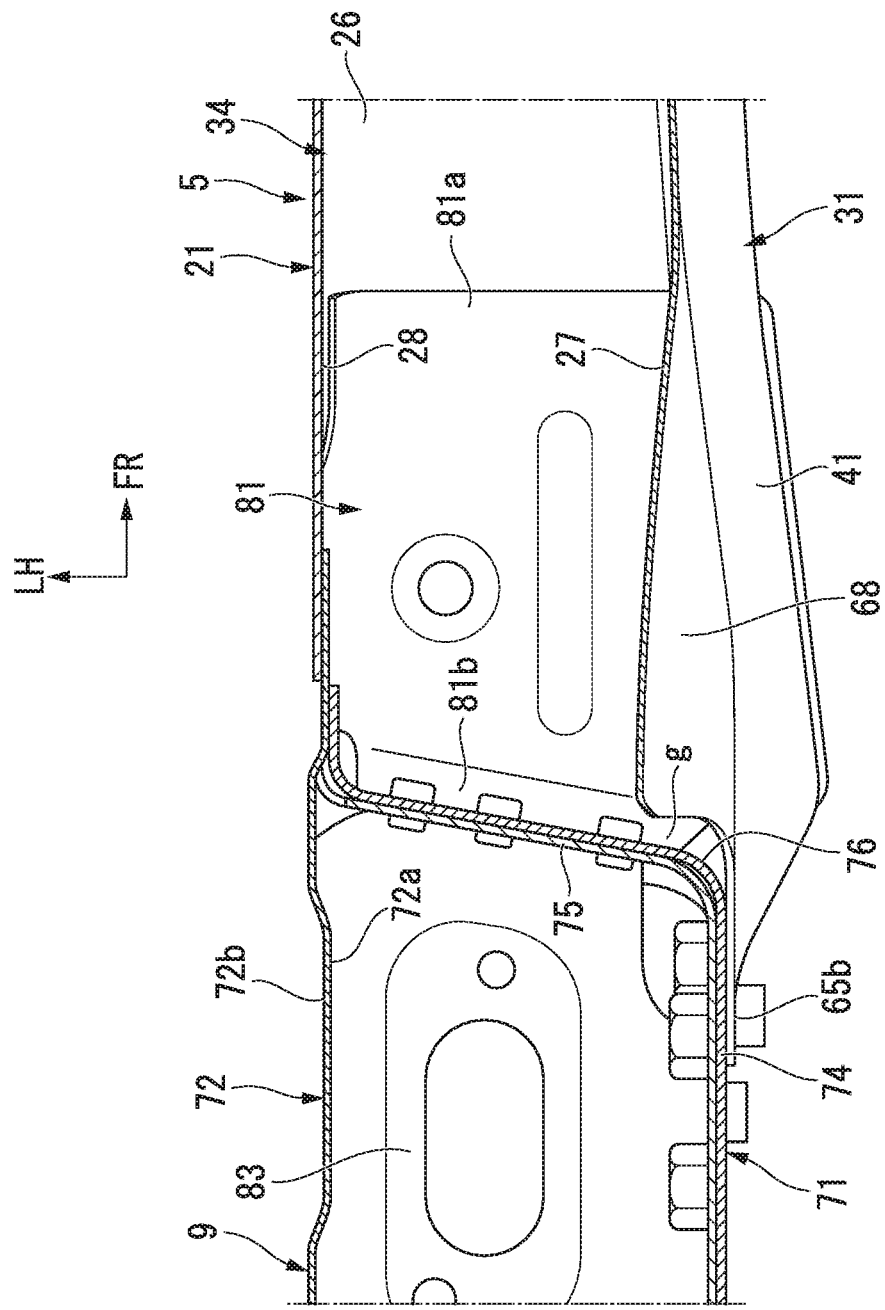
FIG. 9 is a cross-sectional view taken along line F9-F9 of the vehicle body front structure shown in FIG. 2.

FIG. 9 is a cross-sectional view taken along line F9-F9 of the front section of the vehicle body 1 shown in FIG. 1.

As shown in FIG. 9, the outer panel 71 of the front pillar 9 has a sidewall section 74 formed with a gap between an inner panel 72 and the outer panel 71, and a front wall section 75 extending from the front end portion of the sidewall section 74 toward the inner panel 72 in the vehicle body width direction.

The depressed portion 68 of the first L-shaped member 31 is formed with a gap g between the front wall section 75 of the front pillar 9 and the depressed portion 68, and faces at least a portion of the front wall section 75 of the front pillar 9 in the vehicle body forward/rearward direction. For example, the depressed portion 68 faces a corner portion 76 between the front wall section 75 and the sidewall section 74 of the front pillar 9 in the vehicle body forward/rearward direction. The depressed portion 68 can interfere (come into contact) with a portion of the front pillar 9 as it moves toward a rear side of the vehicle body when a force is applied due to a collision from a front side of the vehicle body.

Next, an attachment structure of the lower L-shaped member 34 of the main body section 21 with respect to the front pillar 9 will be described.

Figure 10:
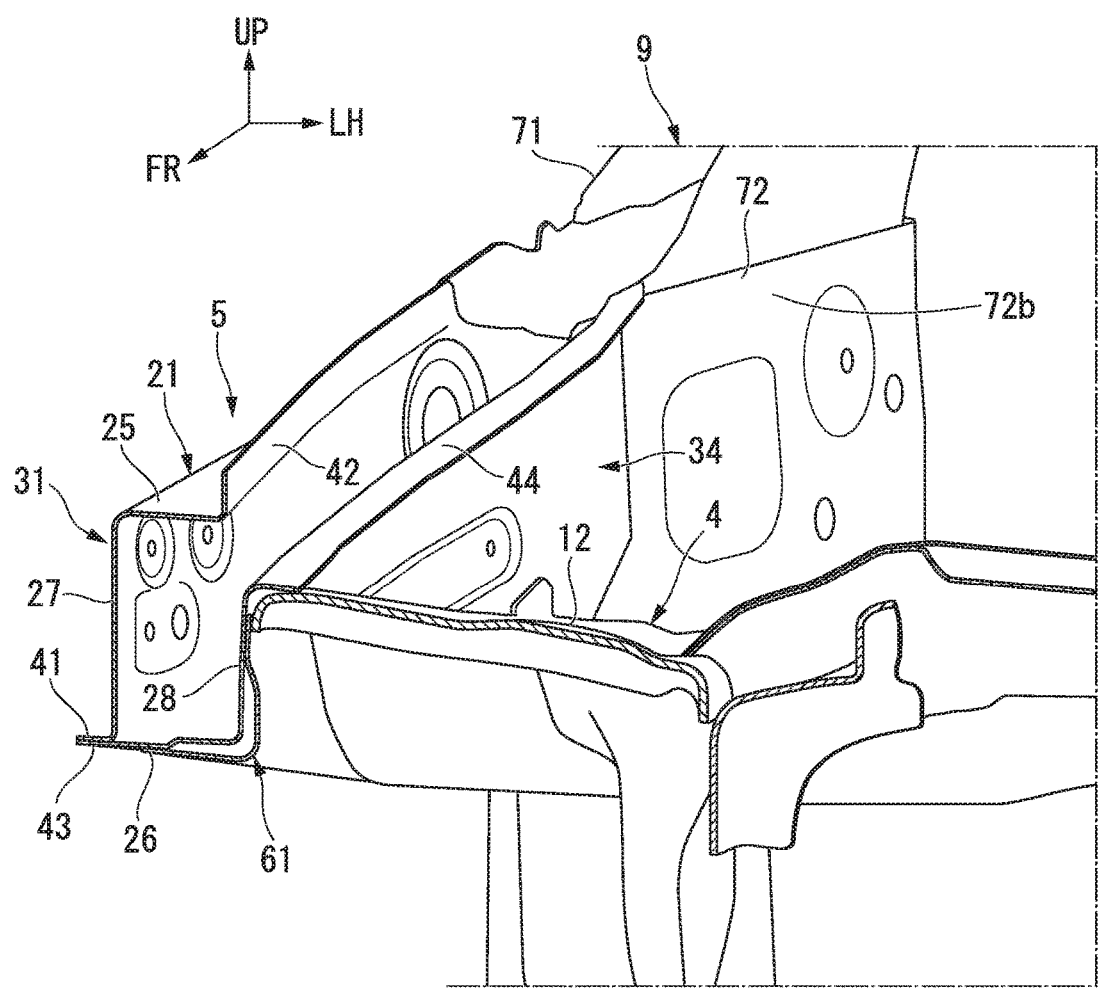
FIG. 10 is a view showing a cross section taken along line F10-F10 of the vehicle body front structure shown in FIG. 5.

FIG. 10 is a view showing a cross section taken along line F10-F10 of the front section of the vehicle body 1 shown in FIG. 5.

As shown in FIG. 10, the lower L-shaped member 34 included in the rear end portion of the main body section 21 is joined to the inner panel 72 of the front pillar 9. Specifically describing, the inner panel 72 of the front pillar 9 has a first surface 72a directed toward the outer panel 71 (see FIG. 9), and a second surface 72b directed toward a side opposite to the first surface 72a. In other words, the second surface 72b of the inner panel 72 is a wall surface directed to the inner side of the vehicle body in the vehicle body width direction. The lower L-shaped member 34 is joined to the second surface 72b of the inner panel 72. Accordingly, the lower L-shaped member 34 is supported by the inner panel 72.

As shown in FIG. 5, the upper member 5 has a connecting member 81 installed on the rear end portion of the upper member 5. The connecting member 81 is connected to the lower L-shaped member 34 and the outer panel 71 of the front pillar 9.

Figure 11:
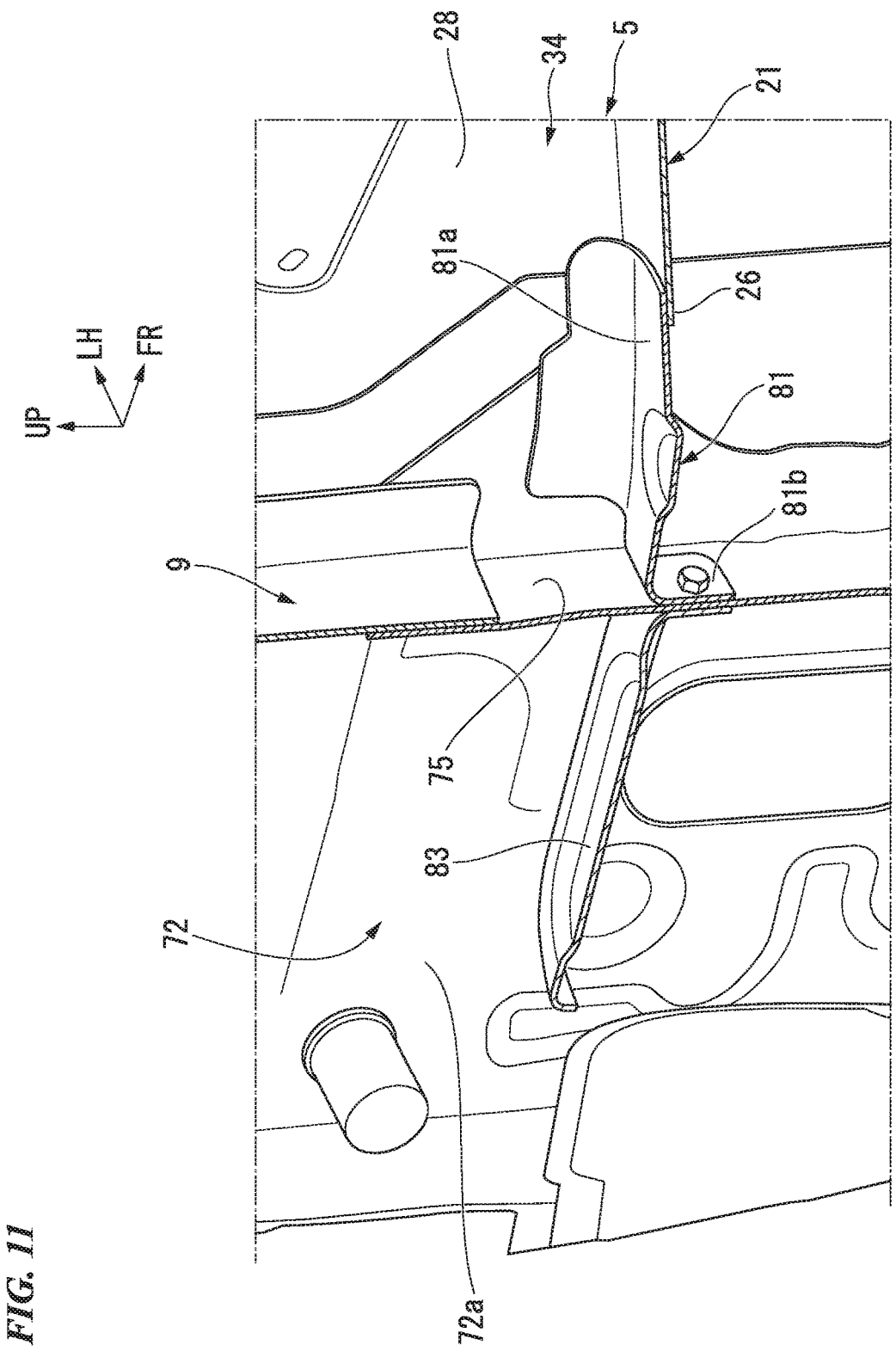
FIG. 11 is a view showing the inside and a cross section of a front pillar of the embodiment of the present invention.

FIG. 11 is a view showing the inside and the cross section of the front pillar 9.

As shown in FIG. 11, the connecting member 81 has a first portion 81a and a second portion 81b.

The first portion 81a extends along the lower wall 26 of the lower L-shaped member 34 and extends along the second standing wall 28. The first portion 81a is fixed to the lower wall 26 and the second standing wall 28 of the lower L-shaped member 34.

Meanwhile, the second portion 81b is formed to be bent downward from the rear end portion of the first portion 81a, and extends along the front wall section 75 of the outer panel 71 of the front pillar 9. The second portion 81b is fixed to the front wall section 75 of the outer panel 71. Accordingly, the connecting member 81 connects the lower wall 26 and the second standing wall 28 of the lower L-shaped member 34 to the front wall section 75 of the outer panel 71.

As shown in FIG. 11, a partition wall (a bulkhead) 83 that is installed substantially horizontally is installed in the front pillar 9. The partition wall 83 is installed between the inner panel 72 and the outer panel 71 and connected to the inner panel 72 and the outer panel 71. Further, "the partition wall" in the present application is used with a meaning including a wall section that partitions at least a portion in the front pillar 9 installed on a portion of the inside of the front pillar 9.

As shown in FIG. 11, the connecting member 81 is installed at substantially the same height as the partition wall 83 of the front pillar 9. Specifically describing, the connecting member 81 is connected to the front wall section 75 of the outer panel 71 at substantially the same height as the partition wall 83 of the front pillar 9 and connected to the partition wall 83 via the outer panel 71. In other words, the connecting member 81 and the partition wall 83 are aligned in the vehicle body forward/rearward direction. Accordingly, the rigidity of the vehicle body front section in the vehicle body forward/rearward direction is increased.

As shown in FIG. 7, the vehicle body front structure has a coupling member 85 installed between the damper base 12 and the front pillar 9. The coupling member 85 extends between the damper base 12 and the front pillar 9 in the vehicle body forward/rearward direction and connects the damper base 12 and the front pillar 9.

Figure 12:
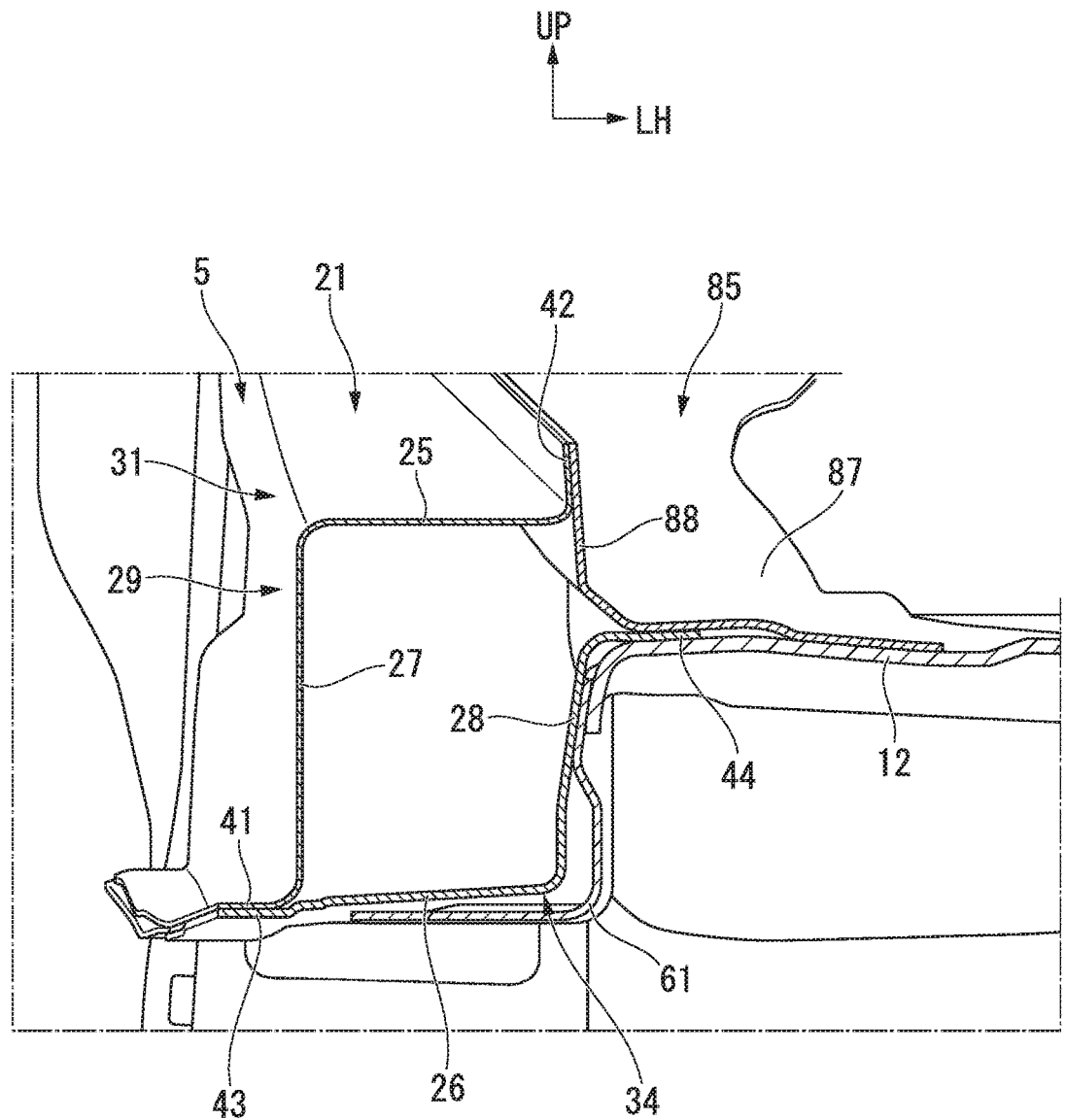
FIG. 12 is a view showing a cross section taken along line F12-F12 of the vehicle body front structure shown in FIG. 7.

FIG. 12 is a view showing a cross section taken along line F12-F12 of the front section of the vehicle body 1 shown in FIG. 7.

As shown in FIG. 12, the coupling member 85 has a substantially L-shaped cross section. That is, the coupling member 85 has a base (a first wall) 87 and an upright wall (a second wall) 88 standing up from the end portion of the base 87.

The base 87 overlaps over the damper base 12. As shown in FIG. 12, the fourth flange 44 of the lower L-shaped member 34 is sandwiched between the base 87 and the damper base 12. The fourth flange 44 extends to be bent in the vehicle body width direction. The base 87 of the coupling member 85 is joined to the damper base 12 together with the fourth flange 44 of the lower L-shaped member 34.

Meanwhile, the upright wall 88 of the coupling member 85 stands upward from the end portion of the base 87 outside in the vehicle body width direction, and extends in the upward/downward direction. The standing wall 88 is disposed over the second standing wall 28 of the lower L-shaped member 34. In addition, the upright wall 88 is aligned to the second flange 42 of the upper L-shaped member (the first L-shaped member) 31 in the vehicle body width direction. The standing wall 88 is joined to the second flange 42 of the upper L-shaped member 31 by, for example, spot welding. Accordingly, the upper L-shaped member 31 and the lower L-shaped member 34 form the closed cross section 29 together with the upright wall 88 of the coupling member 85.

Next, an attachment structure of a fender attachment bracket 91 will be described.

Figure 13:
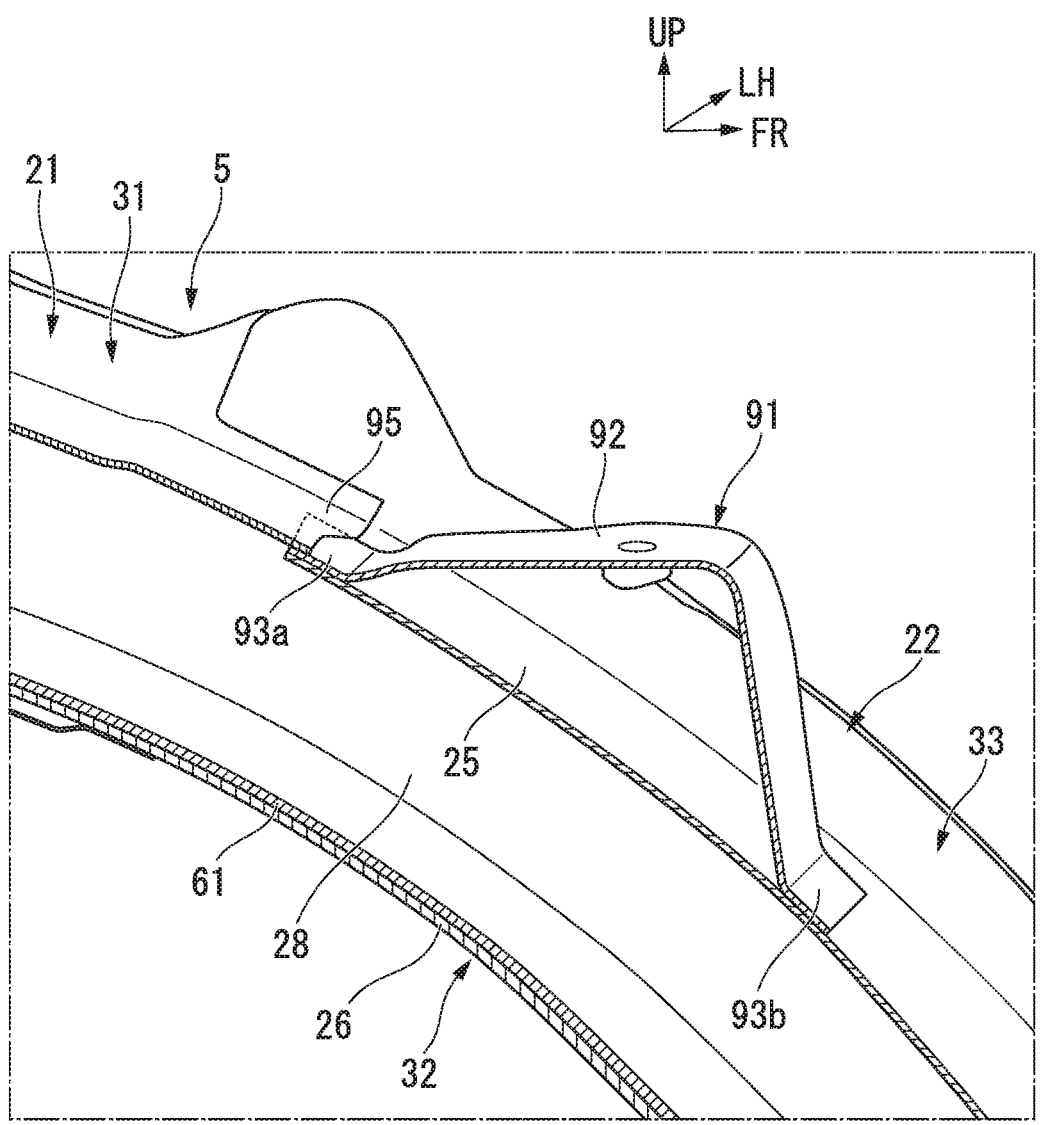
FIG. 13 is a view showing a cross section of an attachment structure of a fender attachment bracket of the embodiment of the present invention.

FIG. 13 is a view showing a cross section of the attachment structure of the fender attachment bracket 91.

As shown in FIG. 13, the fender attachment bracket 91 has an attachment section 92 to which a fender can be attached, a first fixing section 93a formed at a front side of the attachment section 92 in the vehicle body forward/rearward direction, and a second fixing section 93b formed at a rear side of the attachment section 92 in the vehicle body forward/rearward direction.

Here, the first L-shaped member 31 of the upper member 5 has an overlapping section 95 overlapping the surface of the second L-shaped member 33. The overlapping section 95 overlaps the wall surface of the second L-shaped member 33 different from the first flange 41 and the second flange 42. In the embodiment, the overlapping section 95 overlaps above the upper wall 25 of the second L-shaped member 33.

Specifically describing, the overlapping section 95 is formed by extending one wall section of the first L-shaped member 31. In the embodiment, the overlapping section 95 is formed by extending the upper wall 25 of the first L-shaped member 31 from the main body section 21 toward the extension section 22.

The first fixing section 93a of the fender attachment bracket 91 is sandwiched between the overlapping section 95 of the first L-shaped member 31 and the wall surface of the second L-shaped member 33. Accordingly, the first fixing section 93a of the fender attachment bracket 91 is supported by the first L-shaped member 31 and the second L-shaped member 33.

Meanwhile, the second fixing section 93b of the fender attachment bracket 91 is disposed on the first fixing section 93a in front of the vehicle body. The second fixing section 93b is fixed to the upper wall 25 of the second L-shaped member 33. When the second fixing section 93b is fixed to the second L-shaped member 33, the first fixing section 93a does not escape from between the overlapping section 95 of the first L-shaped member 31 and the second L-shaped member 33. For example, the fender attachment bracket 91 is not removed from the upper member 5 even when the first fixing section 93a is not fixed to the upper member 5 by a bolt or welding.

An amount of collision energy absorbed can be increased by the above-mentioned configuration.

Here, since a surface of a cross-sectional shape (open cross-sectional shape) of a bag shape cannot be spot-welded, when the upper member 5 has a bag-shaped cross section, coupling by MIG welding is performed. However, a portion coupled by MIG welding is likely to have the coupling strength smaller than that of a portion coupled by the spot welding.

The upper member 5 of the vehicle body front structure according to the aspect of the present invention includes the main body section 21 extending forward from a substantially central portion of the front pillar 9 in the upward/downward direction, and the extension section 22 extending forward and downward from the main body section 21. The main body section 21 includes the upper L-shaped member 31 having a substantially L-shaped cross section. The extension section 22 includes the upper L-shaped member 33 having a substantially L-shaped cross section. The main body section 21 and the extension section 22 include the lower L-shaped member 32 having a substantially L-shaped cross section. In the embodiment in which the lower L-shaped member 32 is formed over the main body section 21 and the extension section 22, and the closed cross section 29 is formed by joining the flange 41 and the flange 42 formed at both end portions of the upper L-shaped member 31 and the upper L-shaped member 33 in the vehicle body width direction, the upper L-shaped member 31 of the main body section 21 has the extension portion 51, that overlaps the wall surface of the upper L-shaped member 33 of the extension section 22 different from the flange 41 and the flange 42 of the upper L-shaped member 33 of the extension section 22. The extension portion 51 is welded to the wall surface by at least one of the plurality of welded sections P1 separated from each other in the vehicle body forward/rearward direction and the welded sections P1 continuously welded in the vehicle body forward/rearward direction.

According to the configuration, the extension portion 51 formed on the first L-shaped member 31 is joined to the wall surface of the second L-shaped member 33 different from the flange 41 and the flange 42 of the second L-shaped member 33 by welding (for example, MIG welding or laser welding). In addition, at least one of the plurality of welded sections P1 separated from each other in the vehicle body forward/rearward direction and the welded sections P1 continuously welded in the vehicle body forward/rearward direction is formed on the extension portion 51. The welded sections P1 are likely to have a larger the coupling strength of the joint between the main body section 21 and the extension section 22 than the welded section extending along the joint between the main body section 21 and the extension section 22 in the upward/downward direction or the vehicle body width direction. Accordingly, an amount of collision energy absorbed can be increased. In addition, when the extension portion 51 is the extension portion of one wall section of the first L-shaped member 31, the coupling strength of the joint between the main body section 21 and the extension section 22 can be improved while suppressing a decrease in yield from raw materials.

Further, instead of the above-mentioned configuration, the extension portion 51 may be formed on the upper L-shaped member 33 of the extension section 22. In this case, the extension portion 51 overlaps the wall surface of the upper L-shaped member 31 of the main body section 21 different from the flange 41 and the flange 42 of the upper L-shaped member 31 of the main body section 21.

In the embodiment, the extension portion 51 has the hole section 53, and the front edge portion 51a of the extension portion 51 and the edge portion 53a of the hole section 53 are welded to the wall surface of the second L-shaped member 33.

In this case, the extension portion 51 of the first L-shaped member 31 is joined to the second L-shaped member 33 at a plurality of places separated from each other in the vehicle body forward/rearward direction by welding. In addition, as the hole section 53 is formed, a portion (for example, a central portion) of the extension portion 51 other than the end portion of the extension portion 51 can also be welded to the second L-shaped member 33. For this reason, the coupling strength of the joint between the main body section 21 and the extension section 22 can be further increased. Accordingly, an amount of collision energy absorbed can be further increased.

In the embodiment, the extension portion 51 includes the welded sections P1 (for example, the edge portion 53a of the hole section 53) continuously welded in the vehicle body forward/rearward direction (or the direction from the main body section 21 toward the extension section 22), and the welded sections P1 (the front edge portion 51a) continuously welded in the vehicle body forward/rearward direction (or the direction crossing the direction from the main body section 21 toward the extension section 22). According to the above-mentioned configuration, since the extension portion 51 is joined by the plurality of welded sections extending in different directions, the coupling strength of the joint between the main body section 21 and the extension section 22 is further increased.

In the embodiment, the extension portion 51 has the overhanging section 55 that overlaps the first flange 41 of the second L-shaped member 33. The overhanging section 55 is welded to the first flange 41 of the second L-shaped member 33.

Here, the first flange 41 is not the wall section having a bag-shaped cross section. For this reason, the overhanging section 55 of the extension portion 51 can be joined to the first flange 41 by, for example, spot welding. In other words, according to this configuration, the coupling strength of the joint between the main body section 21 and the extension section 22 can be further increased by using MIG welding or laser welding together with spot welding.

In the embodiment, the main body section 21 is formed substantially horizontally. The extension portion 51 is formed on the L-shaped member 31 of the main body section 21 and extends forward and downward from the main body section 21, and the front edge portion 51a of the extension portion 51 is formed linearly in a substantially vertical direction.

According to the configuration, even when the first L-shaped member 31 on which the extension portion 51 is formed is cut out of the steel sheet S1 having a rectangular shape, the first L-shaped member 31 including the extension portion 51 is easy to fit into the steel sheet S1 having the rectangular shape as a whole without waste. For this reason, even when the extension portion 51 is formed, an increase in size required for the steel sheet S1 can be suppressed. Accordingly, the coupling strength of the joint between the main body section 21 and the extension section 22 can be improved while avoiding a decrease in manufacturing yield.

In the embodiment, the vehicle body front structure further comprises the L-shaped reinforcement member 61 formed on the upper member 5. The upper member 5 includes the lower wall 26 and the upright wall 28 standing upward from the end portion of the lower wall 26 in the vehicle body width direction. The L-shaped reinforcement member 61 has a substantially L-shaped cross section along the lower wall 26 and the upright wall 28 of the upper member 5 and extends from the inside of the main body section 21 toward the inside of the extension section 22 to be joined to the main body section 21 and the extension section 22.

In this case, the portion (the lower L-shaped member 32) to which a compressive load is applied by a force input from a front side of the vehicle body is reinforced by the L-shaped reinforcement member 61. For this reason, even when a force due to a collision is input from a front side of the vehicle body and the joint between the main body section 21 and the extension section 22 bends along an exterior shape of the front wheel, the coupling strength of the joint between the main body section 21 and the extension section 22 with respect to a force input from the front side of the vehicle body is further increased. Accordingly, an amount of collision energy absorbed can be further increased.

In the embodiment, the vehicle body front structure further includes the damper base 12 configured to support the damper D of the front suspension. The base section (the base section) of the L-shaped reinforcement member 61 is joined to the damper base 12.

In this case, the base section of the L-shaped reinforcement member 61 is relatively strongly supported by the damper base 12. Accordingly, an amount of collision energy absorbed can be further increased.

In the embodiment, the first L-shaped member 31 included in the main body section 21 has the depressed portion 68 recessed toward the inside of the vehicle body in the vehicle body width direction and facing at least a portion of the front pillar 9 in the vehicle body forward/rearward direction.

In this case, even when a force due to a collision is input from the front side of the vehicle body, as the depressed portion 68 interferes with the front pillar 9, some of the collision energy can be absorbed between the depressed portion 68 and the front pillar 9. Accordingly, an amount of collision energy absorbed can be further increased.

In the embodiment, the lower L-shaped member 34 of the main body section 21 is joined to the inner panel 72 of the front pillar 9 and connected to the outer panel 71 of the front pillar 9 by the connecting member 81. The connecting member 81 is installed at substantially the same height as the partition wall 83 that is formed substantially horizontally in the front pillar 9.

In this case, since the lower L-shaped member 34 is connected to both of the inner panel 72 and the outer panel 71 of the front pillar 9, a joining strength between the main body section 21 and the front pillar 9 is further increased.

In addition, since the connecting member 81 and the partition wall 83 are aligned to the vehicle body forward/rearward direction, the rigidity with respect to the vehicle body forward/rearward direction is increased. Accordingly, an amount of collision energy absorbed can be further increased.

In the embodiment, the vehicle body front structure further includes the coupling member 85 configured to connect the damper base 12 and the front pillar 9. The main body section 21 includes the first L-shaped member 31 and the lower L-shaped member 34 as the pair of L-shaped members. The first L-shaped member 31 and the lower L-shaped member 34 form the closed cross section 29 together with the coupling member 85.

In this case, the joining strength between the front pillar 9 and the main body section 21 is further increased by the coupling member 85. Accordingly, an amount of collision energy absorbed can be further increased.

In the embodiment, the upper L-shaped member 31 of the main body section 21 is fastened to the outer panel 71 of the front pillar 9 by the bolt 67.

In this case, the joining strength between the front pillar 9 and the main body section 21 is further increased. Accordingly, an amount of collision energy absorbed can be further increased.

In the embodiment, the upper L-shaped member 31 of the main body section 21 has the overlapping section 95 overlapping the wall surface of the upper L-shaped member 33 of the extension section 22 different from the flange 41 and the flange 42 of the upper L-shaped member 33 of the extension section 22. The fender attachment bracket 91 is sandwiched between the overlapping section 95 of the upper L-shaped member 31 and the wall surface of the upper L-shaped member 33 which the overlapping section 95 overlaps.

In this case, support strength of the fender attachment bracket 91 can be improved, and assembly workability of the fender attachment bracket 91 can be improved.

Further, the present invention is not limited to the embodiment, and various design changes may be made without departing from the scope of the present invention.

REFERENCE SIGNS LIST

1 Vehicle body
5 Upper member
9 Front pillar
21 Main body section
22 Extension section
25 Upper wall
26 Lower wall
27 First standing wall
28 Second standing wall
29 Closed cross section
31 Upper L-shaped member (first L-shaped member) of main body section
32 Lower L-shaped member (third L-shaped member) over main body section and extension section
33 Upper L-shaped member (second L-shaped member) of extension section
34 Lower L-shaped member (fourth L-shaped member) of main body section
41, 42, 43, 44 Flange
51 Extension portion
51a Front edge portion
53 Hole section
53a Edge portion of hole section
55 Overhanging section
61 L-shaped reinforcement member
67 Bolt
68 Depressed portion
71 Outer panel
72 Inner panel
81 Connecting member
83 Partition wall (bulkhead)
85 Coupling member
91 Fender attachment bracket

What is claimed is:

1. A vehicle body front structure comprising:
an upper member including a main body section extending forward from a substantially central portion of a front pillar in an upward/downward direction; and an extension section extending forward and downward from the main body section,
wherein the main body section includes a first L-shaped member having a substantially L-shaped cross section,
the extension section includes a second L-shaped member having a substantially L-shaped cross section,
the main body section and the extension section include a third L-shaped member having a substantially L-shaped cross section,
the third L-shaped member is formed over the main body section and the extension section, and a closed cross section is formed by joining flanges formed on both end portions of the first L-shaped member and the second L-shaped member in the vehicle body width direction,
either one of the first L-shaped member and the second L-shaped member has an extension portion, that overlaps a wall surface of the other one of the first L-shaped member and the second L-shaped member different from the flange of the other one of the first L-shaped member and the second L-shaped member, and the extension portion is welded to the wall surface by at least one of a plurality of welded sections separated from each other in a vehicle body forward/rearward direction and welded sections continuously welded in the vehicle body forward/rearward direction,
either one of the first L-shaped member and the second L-shaped member having the extension portion has an overlapping section that overlaps a wall surface of the other one of the first L-shaped member and the second L-shaped member different from the flange of the other one of the first L-shaped member and the second L-shaped member, and
a fender attachment bracket is sandwiched between the overlapping section and the wall surface which the overlapping section overlaps.

2. The vehicle body front structure according to claim 1, wherein the main body section includes a fourth L-shaped member installed between the third L-shaped member and the front pillar, having a substantially L-shaped cross section and combined with the first L-shaped member,
the fourth L-shaped member is joined to an inner panel of the front pillar and connected to an outer panel of the front pillar by a connecting member, and the connecting member is formed at substantially the same height as a partition wall formed substantially horizontally in the front pillar.

3. The vehicle body front structure according to claim 2, further comprising:
a damper base configured to support a damper of a front suspension; and
a coupling member configured to connect the damper base and the front pillar,
wherein the main body section includes a fourth L-shaped member that is installed between the third L-shaped member and the front pillar, that has a substantially L-shaped cross section and that is combined with the first L-shaped member, and
the first L-shaped member and the fourth L-shaped member form a closed cross section together with the coupling member.

4. The vehicle body front structure according to claim 2, wherein the first L-shaped member is fastened to an outer panel of the front pillar by a bolt.

5. The vehicle body front structure according to claim 1, further comprising:
a damper base configured to support a damper of a front suspension; and
a coupling member configured to connect the damper base and the front pillar,
wherein the main body section includes a fourth L-shaped member that is installed between the third L-shaped member and the front pillar, that has a substantially L-shaped cross section and that is combined with the first L-shaped member, and
the first L-shaped member and the fourth L-shaped member form a closed cross section together with the coupling member.

6. The vehicle body front structure according to claim 1, wherein the first L-shaped member is fastened to an outer panel of the front pillar by a bolt.

* * * * *